(12) United States Patent
Inoue

(10) Patent No.: US 9,623,708 B2
(45) Date of Patent: Apr. 18, 2017

(54) PNEUMATIC TIRE

(71) Applicant: SUMITOMO RUBBER INDUSTRIES, LTD., Kobe-shi, Hyogo (JP)

(72) Inventor: Seiji Inoue, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 707 days.

(21) Appl. No.: 14/060,343

(22) Filed: Oct. 22, 2013

(65) Prior Publication Data
US 2014/0138000 A1 May 22, 2014

(51) Int. Cl.
*B60C 11/03* (2006.01)
*B60C 11/13* (2006.01)

(52) U.S. Cl.
CPC ...... *B60C 11/0304* (2013.04); *B60C 11/0309* (2013.04); *B60C 11/1392* (2013.04); *B60C 2011/0339* (2013.04); *B60C 2011/0341* (2013.04); *B60C 2011/0344* (2013.04); *B60C 2011/0348* (2013.04); *B60C 2011/0353* (2013.04); *B60C 2011/0355* (2013.04); *B60C 2011/0393* (2013.04); *B60C 2011/0395* (2013.04)

(58) Field of Classification Search
CPC ..... B60C 2011/0339; B60C 2011/0341; B60C 2011/0344; B60C 2011/0353; B60C 2011/0355; B60C 2011/0395; B60C 2011/0393; B60C 2011/0348; B60C 11/0304; B60C 11/0309; B60C 11/1392
USPC ............... 152/209.1, 209.8, 209.18, 209.28
See application file for complete search history.

(56) References Cited

U.S. PATENT DOCUMENTS

| | | | |
|---|---|---|---|
| 2002/0053382 A1 | 5/2002 | Mori et al. | |
| 2005/0269004 A1* | 12/2005 | Miyabe | B60C 11/0304 152/209.9 |
| 2010/0200134 A1* | 8/2010 | Murata | B60C 11/0306 152/209.9 |
| 2010/0326577 A1* | 12/2010 | Iwai | B60C 11/0309 152/209.24 |

* cited by examiner

*Primary Examiner* — Seyed Masoud Malekzadeh
(74) *Attorney, Agent, or Firm* — Birch, Stewart, Kolasch & Birch, LLP

(57) ABSTRACT

A pneumatic tire comprises a tread portion provided with a central main groove, an outboard shoulder main groove and an inboard shoulder main groove extending continuously in the tire circumferential direction. The central main groove and the inboard shoulder main groove are each connected to grooves and/or sipes. The outboard shoulder main groove is widest and not connected to any grooves inclusive of a sipe or a very narrow groove. On both sides of the outboard shoulder main groove, there are formed sloping surfaces extending from the respective groove edges and merging into the tread surface. The width of each sloping surface is more than the depth thereof.

10 Claims, 3 Drawing Sheets

PNEUMATIC TIRE

BACKGROUND OF THE INVENTION

The present invention relates to a pneumatic tire, more particularly to a left-right asymmetric tread configuration capable of improving wet performance, steering stability and noise performance in good balance.

Usually, a pneumatic tire such as passenger car tire is provided in the tread portion with circumferentially continuously extending main grooves. By increasing the widths of such main grooves, the drainage is enhanced, and wet performance may be improved. However, due to such wide main grooves, if the rigidity of the tread pattern is decreased and becomes insufficient, steering stability is deteriorated. Moreover, when a pneumatic tire provided with wide main grooves run on a smooth road surface, air in the wide main groove tends to resonate and the noise performance tends to deteriorate. Thus, the wet performance, noise performance and steering stability are contradictory.

SUMMARY OF THE INVENTION

It is therefore, an object of the present invention to provide a pneumatic tire, in which the wet performance, steering stability and noise performance are improved in good balance.

According to the invention, a pneumatic tire comprises
a tread portion provided with a left-right asymmetric tread pattern comprising three circumferentially continuously extending main grooves which are a central main groove whose widthwise center line is disposed in a tread center region having a width of 20% of the tread width TW and centered on the tire equator, an outboard shoulder main groove and an inboard shoulder main groove, wherein
the width of the outboard shoulder main groove is larger than the width of the central main groove and the width of the inboard shoulder main groove,
the central main groove connects to a groove and/or a sipe,
the inboard shoulder main groove connects to a groove and/or a sipe,
the outboard shoulder main groove connects to neither a groove nor a sipe,
an inboard sloping surface and an outboard sloping surface are formed on both sides of the outboard shoulder main groove, respectively, so that the inboard sloping surface and the outboard sloping surface extend from the opposite groove-sidewalls of the outboard shoulder main groove toward both sides of the outboard shoulder main groove and merge into the tread surface,
the width of the inboard sloping surface is more than the depth of the inboard sloping surface measured radially at the groove-sidewall from the tread surface, and
the width of the outboard sloping surface is more than the depth of the outboard sloping surface measured radially at the groove-sidewall from the tread surface.

The pneumatic tire according to present invention may be provided with the following features (1)-(4):
(1) the width of the outboard sloping surface is more than the width of the inboard sloping surface, and the depth of the outboard sloping surface is less than the depth of the inboard sloping surface;
(2) on both sides of the central main groove and on both sides of the inboard shoulder main groove, sloping surfaces are not formed;
(3) both edges of the central main groove and both edges of the inboard shoulder main groove are chamfered; and
(4) a circumferentially continuously extending sipe is disposed axially inside the inboard sloping surface at a distance of not more than 10 mm from the outboard shoulder main groove.

According to the present invention, as the tread pattern is left-right asymmetrical (asymmetry about the tire equator), the mounting position of the tire (the inside and outside of the tire) is specified. Thus, the tread portion has an outboard tread edge to be positioned away from the center of the vehicle body and an inboard tread edge to be positioned close to the center of the vehicle body. For example, the sidewall portion to be located on outside when installed on the vehicle is provided with an indication such as "outside", and the sidewall portion to be located on inside is provided with an indication such as "inside".

According thereto, in this application, the terms "outboard" and "inboard" are used toward the outboard tread edge and inboard tread edge, respectively, to refer relative positions in the tire axial direction.

The terms "axially inner", "axially inward" and the like are used toward the tire equator, and
the terms "axially outer", "axially outward" and the like are used toward the tread edge in order to refer relative positions in the tire axial direction.

In this application including specification and claims, various dimensions, positions and the like of the tire refer to those under a 5% pressure condition of the tire unless otherwise noted.

The 5% pressure condition is such that the tire is mounted on a standard wheel rim and inflate to 5% of a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like. In case of passenger car tires, however, the standard pressure is uniformly defined by 180 kPa.

The tread edges Te are the axial outermost edges of the ground contacting patch which occurs under the normally inflated loaded condition when the camber angle of the tire is zero.

The tread width TW is the width measured under the 5% pressure condition, as the axial distance between the tread edges Te determined as above.

Incidentally, the shape or profile of the tire under the 5% pressure condition usually approximates that in the vulcanization mold.

DESCRIPTION OF THE PREFERRED EMBODIMENTS

Embodiments of present invention will now be described in detail in conjunction with accompanying drawings.

Figure 1:
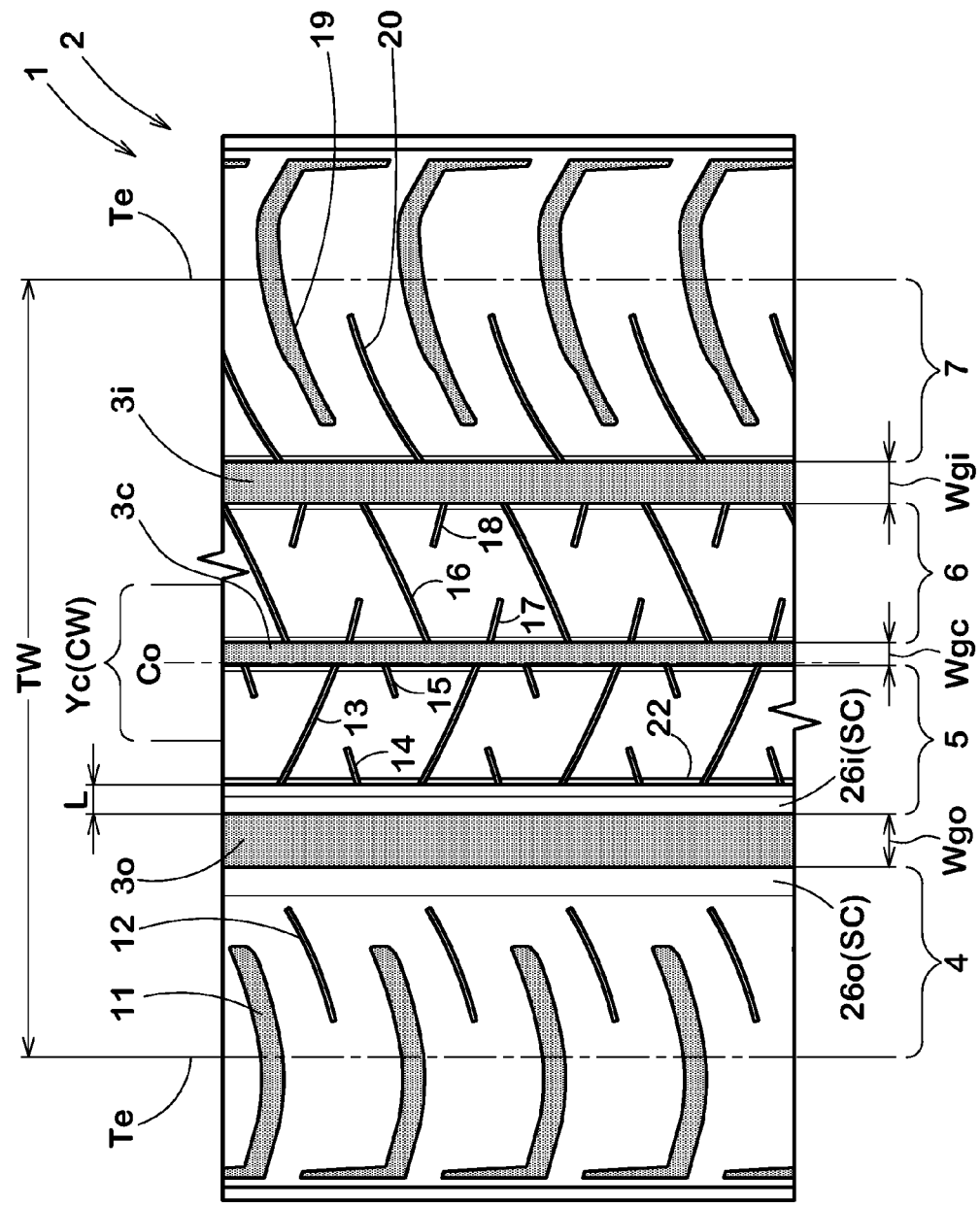
FIG. 1 is a developed partial view of the tread portion of a pneumatic tire as an embodiment of the present invention.

As shown in FIG. 1, pneumatic tire 1 as an embodiment of the present invention is provided in the tread portion with a left-right asymmetric tread pattern which is nondirectional (or bidirectional) in this embodiment.

In this tread pattern, the tread portion 2 is provided with three circumferentially extending main grooves which are:

a central main groove 3c whose widthwise center resides in the tread center region Yc, an outboard shoulder main groove 3o disposed on the outboard tread edge side of the central main groove 3c, and an inboard shoulder main groove 3i disposed on the inboard tread edge side of the central main groove 3c so that the tread portion 2 is divided into four annular land portions which are:

an outboard shoulder land portion 4 between the groove 3o and outboard tread edge Te, an outboard crown land portion 5 between the grooves 3o and 3c, an inboard crown land portion 6 between the grooves 3c and 3i, an inboard shoulder land portion 7 between the groove 3i and inboard tread edge Te.

Here, the tread center region Yc is defined as having a width CW of 20% of the tread width TW and centered on the tire equator Co.

The main grooves (3c, 3i and 3o) are each defined as having a width of not less than 4 mm.

The main grooves in this example are each formed as a straight groove in order to improve the drainage performance.

The width Wgo of the outboard shoulder main groove 3o is more than the width Wgc of the central main groove 3c and the width Wgi of the inboard shoulder main groove 3i.

The outboard tread portion where the outboard shoulder main groove 3o is formed, is subjected to relatively large loads during cornering and also when changing a lane, and affect the steering stability more than the inboard and central tread portions where the inboard and central main grooves 3i and 3c are formed. Therefore, by making the outboard shoulder main groove 3o widest to increase the drainage, wet performance is improved.

In the this embodiment, the width Wgc of the central main groove 3c is smallest in the three main grooves 3c, 3i and 3o.

The ground pressure of the central tread portion where the central main groove 3c is formed, becomes high during straight running, and the air in the central main groove 3c is liable to be excited and generate a resonance noise.

Therefore, the central main groove 3c is formed as being narrowest in order to make the air resonance hard to occur.

Preferably, the width Wgo of the outboard shoulder main groove 3o is set in a range of not less than 1.2 times but not more than 2.0 times the width Wgc of the central main groove 3c. If less than 1.2 times, the above-mentioned effects become insufficient. If more than 2.0 times, the drainage becomes uneven in the tire axial direction and the wet performance as a whole is deteriorated. In addition, air resonance in the outboard shoulder main groove 3o is liable to increase and the noise performance as a whole is deteriorated.

Preferably, the sum total (Wgc+Wgi+Wgo) of the widths Wgc, Wgi and Wgo of the main grooves 3c, 3i and 3o is set in the range of from 15% to 25% of the tread width TW.

In the case of a passenger car tire, the depths Dgc, Dgi and Dgo of the main groove 3c, 3i and 3o are preferably set in a range of from 5 to 10 mm. The groove depths Dgc, Dgi and Dgo are substantially same.

The outboard shoulder main groove 3o is independent and not connected to any kind of groove inclusive of very narrow or almost zero width groove so called sipe or cut.

On the other hand, each of the central main groove 3c and the inboard shoulder main groove 3i is connected to grooves and/or sipes.

In this application, if the groove width is 2.0 mm or more, it is called groove. If the groove width is less than 2.0 mm, it is called sipe.

In this embodiment, the outboard shoulder land portion 4 is provided with axial grooves 11 arranged circumferentially of the tire at intervals, and sipes 12 arranged circumferentially of the tire at intervals.

The axially inner ends of the axial grooves 11 and the axially inner ends of the sipes 12 terminate within the outboard shoulder land portion 4 without connected to the outboard shoulder main groove 3o.

The outboard crown land portion 5 is provided with sipes 13 arranged circumferentially of the tire at intervals, sipes 14 arranged circumferentially of the tire at intervals, and sipes 15 arranged circumferentially of the tire at intervals.

The axially outer ends of the sipes 13, 14 and 15 terminate within the outboard crown land portion 5 without connected to the outboard shoulder main groove 3o.

The axially inner ends of the sipes 13 and 15 are connected to the central main groove 3c.

The axially inner ends of the sipes 14 terminate within the outboard crown land portion 5 without connected to the central main groove 3c.

The inboard crown land portion 6 is provided with sipes 16 arranged circumferentially of the tire at intervals, sipes 17 arranged circumferentially of the tire at intervals, and sipes 18 arranged circumferentially of the tire at intervals.

The axially inner ends of the sipes 16 and 17 are connected to the central main groove 3c.

The axially inner ends of the sipes 18 terminate within the inboard crown land portion 5 without connected to the central main groove 3c.

The axially outer ends of the sipes 16 and 18 are connected to the inboard shoulder main groove 3i.

The axially outer ends of the sipes 17 terminate within the inboard crown land portion 5 without connected to the inboard shoulder main groove 3i.

The inboard shoulder land portion 7 is provided with axial groove 19 arranged circumferentially of the tire at intervals, and sipes 20 arranged circumferentially of the tire at intervals.

The axially inner ends of the sipes 20 are connected to the inboard shoulder main groove 3i.

The axially outer ends of the sipes 20 terminate within the inboard shoulder land portion 7 without reaching to the inboard tread edge Te.

The axially inner ends of the axial groove 19 terminate within the inboard shoulder land portion 7 without connected to the inboard shoulder main groove 3i.

The axial groove 19 extend beyond the inboard tread edge Te.

Aside from such configuration, the axial grooves 11 and 19 may be replaced by sipes, and the sipes 12, 13 to 18 and 20 may be replaced by axial grooves.

As explained, the outboard shoulder main groove 3o is not connected to any grooves (inclusive of sipes), therefore, high rigidity can be provided on both sides of the outboard shoulder main groove 3o, and the steering stability under can be improved.

Usually, when the width of a straight circumferential groove is increased, the air therein is liable to be excited and generate resonance sound noise. However, as the outboard shoulder main groove 3o is not connected to any grooves, the excitation becomes reduced. Even if excited, the leakage of the noise sound is prevented. Thus, the deterioration of noise performance can be avoided.

Figure 2:
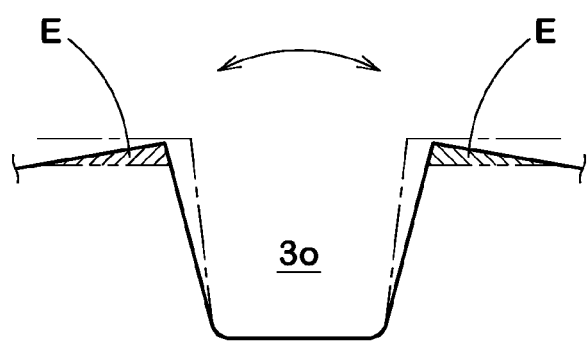
FIG. 2 is a cross sectional view of a gaping groove for explaining the negative effect.

On the other hand, when the width of a straight circumferential groove is increased, as the tread rubber thickness is decreased in the grooved portion, the bending rigidity of the grooved portion is decreased, and the tread portion becomes liable to be deform such that the width of the opening of the groove increases as shown in FIG. 2. As a result, the ground pressure of both edge portions E of the wide circumferential groove is unevenly increased. Further, when the groove is not connected to any grooves, as the rigidity of the edge portions E is high, the variation of the uneven ground pressure becomes large and affect the road grip performance, and the improvement in the steering stability is inhibited.

Figure 3:
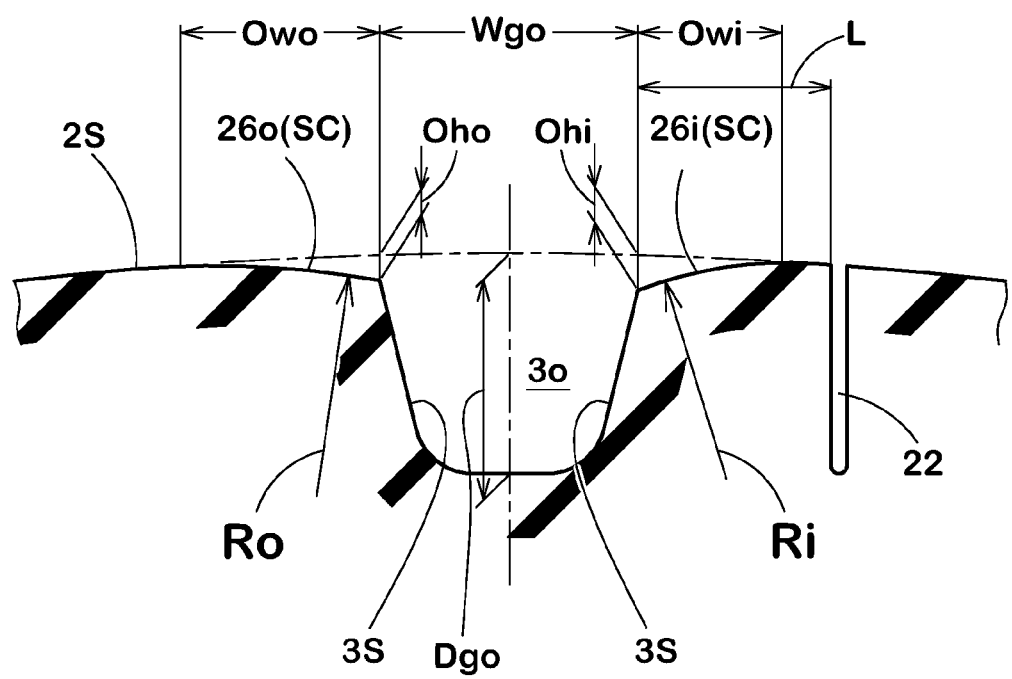
FIG. 3 is a cross sectional view of the outboard shoulder main groove and its vicinity showing sloping surfaces on both sides of the groove.

According to the present invention, however, on both sides of the outboard shoulder main groove 3o, as shown in FIG. 3, there are provided an inboard sloping surface 26i and an outboard sloping surface 26o, respectively.

Therefore, the unevenness of the ground pressure resulting from the bending deformation shown in FIG. 2 can be reduced.

Each sloping surface 26 (26i, 26o) extends between the groove-sidewall surfaces 3s and the tread surface 2s, and smoothly merges into the tread surface 2s.

The width Owi of the inboard sloping surface 26i is more than the depth Ohi of the inboard sloping surface 26i. (Owi>Ohi) The width Owo of the outboard sloping surface 26o is more than the depth Oho of the outboard sloping surface 26o. (Owo>Oho) The sloping surfaces 26i and 26o are generically referred to as 26. The sloping surface widths Owi and Owo are generically referred to as Ow. The sloping surface depths Ohi and Oho are generically referred to as Oh.

Therefore, the decrease in the ground contacting area and the decrease in the rigidity on both sides of the outboard shoulder main groove 3o can be suppressed, and the unevenness of the ground pressure is reduced. Thus, the ground pressure is evened, and the steering stability can be improved.

Preferably, the depths Oh are set in a range of 0.1 to 0.5 mm, the widths Ow are set in a range of 1.0 to 5.0 mm, and the ratio Oh/Ow of each sloping surface is set in a range of 0.02 to 0.5.

In the tire meridian section, each sloping surface 26 is an arc, and the radius of curvature Ri of the inboard sloping surface 26i is less than the radius of curvature Ro of the outboard sloping surface 26o.

Meanwhile, the above-mentioned width Wgo of the outboard shoulder main groove 3o is the axial distance between the radially inner ends P of the opposite sloping surfaces 26.

In this embodiment, the width Owo of the outboard sloping surface 26o is set to be more than the width Owi of the inboard sloping surface 26i (Owo>Owi), and the depth Oho of the outboard sloping surface 26o is set to be less than the depth Ohi of the inboard sloping surface 26i (Oho<Ohi).

In general, the ground pressure of the axially inner edge of a main groove becomes higher than that of the axially outer edge. Therefore, the inboard sloping surface 26i have to be deeper than the outboard sloping surface 26o.

If the outboard sloping surface 26o is deeper than the inboard sloping surface 26i, the ground pressure of the axially inner edge increases.

In order to reduce the unevenness of the ground pressure and improve the ground contact, it is desirable that the depth Oho of the outboard sloping surface 26o is relatively decreased and the width Owo thereof is relatively increased.

In this example, a circumferentially extending sipe 22 is disposed axially inside the inboard sloping surface 26i in order to further reduce the unevenness of the ground pressure. The distance L between the sipe 22 and the outboard shoulder main groove 3o is preferably set in a range of not more than 10 mm.

Such circumferential sipe 22 provides flexibility in the axial direction while suppressing the decrease in the circumferential rigidity. Therefore, the unevenness of the ground pressure in the axially inner edge portion is suppressed, and the ground pressure is further evened.

In this example, the circumferential sipe 22 extends straight at the positions of the outboard ends of the axial sipes 13 and 14.

As to the central main groove 3c and the inboard shoulder main groove 3i, on the other hand, their groove edge portions are provided with flexibility by the grooves and/or sipes connected to the grooves 3c and 3i, and the unevenness of the ground pressure is relatively small.

Therefore, with respect to each of the central main groove 3c and the inboard shoulder main groove 3i, it is preferable that sloping surfaces 26 are not provided not to decrease the ground contacting area and to maintain the steering stability.

Figure 4:
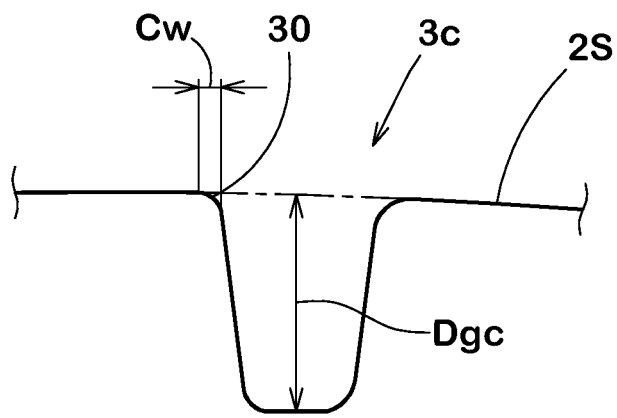
FIG. 4 is a cross sectional view of the central main groove and its vicinity.
Figure 5:
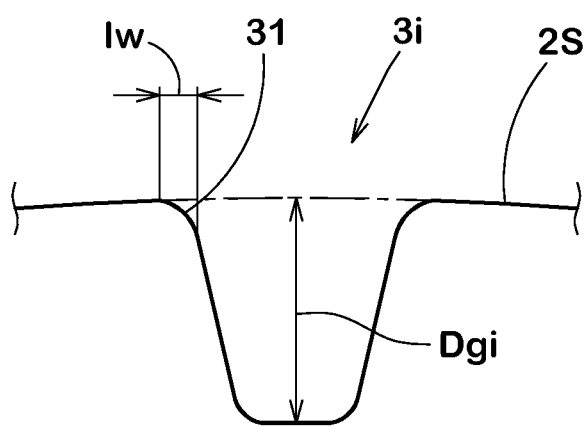
FIG. 5 is a cross sectional view of the inboard shoulder main groove and its vicinity.

As shown in FIGS. 4 and 5, instead of sloping surfaces 26, chamfers 30 and 31 may be provided at the edges of the central main groove 3c and the inboard shoulder main groove 3i. The widths Cw and Iw of the chamfers 30 and 31 are set to be less than the width Ow of the sloping surface 26 in order to suppress the decrease in the ground contacting area.

The chamfer 30, 31 may be an arc or a straight line in the tire meridian section, in this example, a circular arc of 1 mm radius.

Comparison Tests

Based on the tread pattern shown in FIG. 1, pneumatic tires of size 175/65R14 (rim size 14×5.0 J) were manufactured and tested for noise performance, wet performance and steering stability. The specifications are shown in Table 1.

Common specifications are as follows:
tread width TW: 134 mm
axial grooves 11 and 19
  width: 3.8 mm
  depth: 6.0 mm
sipes 12, 13-18 and 20
  width: 0.8 mm
  depth: 4.0 mm
outboard shoulder main groove 3o
  width Wgo: Table 1
  depth Dgo: 7.5 mm
  sloping surfaces: Table 1
central main groove 3c
  width Wgc: Table 1
  depth Dgc: 7.5 mm
  chamfer: circular arc (depth 1.0 mm, width 1.0 mm)
inboard shoulder main groove 3i
  width Wgi: Table 1
  depth Dgi: 7.5 mm
  chamfer: circular arc (depth 1.0 mm, width 1.0 mm)
<Noise Performance Test>

Using a tire test drum (diameter 1.7 m), noise level was measured at frequency band of 1000 Hz according to JASO c606-81.
  tire pressure: 230 kPa
  tire load: 3.48 kN
  speed: 100 km/h The results are indicated in Table 1 by an index based on comparative example tire Ref. 1 being 100, the larger the index number, the better the noise performance.
<Wet Performance Test>

Test tires were installed on four wheels of a test car, Japanese-made 2500 cc FR passenger car. The test car was run along a 100 meter radius circle on an asphalt road partially provided with a 10 mm depth 20 m long water pool, and the lateral acceleration (lateral G) during running in the water pool was measured at the front wheels, gradually increasing the speed entering into the water pool, to obtain the average for the speed range of from 50 to 80 km/h.

The results are indicated in Table 1 by an index based on comparative example tire Ref. 1 being 100, wherein the larger is better.
<Steering Stability Test>

The test car was run on a dry asphalt road in a test course, and the test driver evaluated steering stability based on the handle response, rigidity, grip and the like.

The results are indicated by an index based on comparative example tire Ref. 1 being 100, wherein the larger the index number, the better the steering stability.

From the test results, it was confirmed that, according to the present invention, the wet performance, steering stability and noise performance can be improved in good balance.

TABLE 1

|  | Tire | | | | | | | | |
|---|---|---|---|---|---|---|---|---|---|
|  | Ref.1 | Ex.1 | Ex.2 | Ex.3 | Ex.4 | Ex.5 | Ex.6 | Ref.2 | Ref.3 |
| outboard shoulder main groove | | | | | | | | | |
| width Wgo (mm) | 9.3 | 9.3 | 9.3 | 9.3 | 9.3 | 9.3 | 9.3 | 9.3 | 9.3 |
| connection *1 | N | N | N | N | N | N | N | N | N |
| central main groove | | | | | | | | | |
| width Wgc (mm) | 6 | 6 | 6 | 6 | 6 | 6 | 6 | 6 | 6 |
| connection *1 | Y | Y | Y | Y | Y | Y | Y | Y | Y |
| inboard shoulder main groove | | | | | | | | | |
| width Wgi (mm) | 9.2 | 9.2 | 9.2 | 9.2 | 9.2 | 9.2 | 9.2 | 9.2 | 9.2 |
| connection *1 | Y | Y | Y | Y | Y | Y | Y | Y | Y |
| Wgo/Wgc | 1.55 | 1.55 | 1.55 | 1.55 | 1.55 | 1.55 | 1.55 | 1.55 | 1.55 |
| Wgo + Wgc + Wgi (mm) | 24.5 | 24.5 | 24.5 | 24.5 | 24.5 | 24.5 | 24.5 | 24.5 | 24.5 |
| outboard sloping surface | none | | | | | | | | |
| width Owo (mm) | 0 | 3.0 | 1.0 | 5.0 | 3.0 | 3.0 | 4.0 | 1.0 | 3.0 |
| depth Oho (mm) | 0 | 0.3 | 0.3 | 0.3 | 0.1 | 0.5 | 0.2 | 1.0 | 0.3 |
| profile | — | arc | arc | arc | arc | arc | arc | arc | straight |
| (merged ? *2) | | Y | Y | Y | Y | Y | Y | Y | N |
| inboard sloping surface | none | | | | | | | | |
| width Owi (mm) | 0 | 3.0 | 1.0 | 5.0 | 3.0 | 3.0 | 2.0 | 1.0 | 3.0 |
| depth Ohi (mm) | 0 | 0.3 | 0.3 | 0.3 | 0.1 | 0.5 | 0.4 | 1.0 | 0.3 |
| profile | — | arc | arc | arc | arc | arc | arc | arc | straight |
| (merged ? *2) | | Y | Y | Y | Y | Y | Y | Y | N |
| circumferential sipe | | | | | | | | | |
| distance L (mm) | 7 | 7 | 7 | 7 | 7 | 7 | 7 | 7 | 7 |
| noise performance | 100 | 120 | 105 | 110 | 105 | 110 | 120 | 95 | 120 |
| wet performance | 100 | 120 | 105 | 125 | 105 | 125 | 120 | 130 | 125 |
| steering stability | 100 | 115 | 105 | 110 | 105 | 110 | 120 | 100 | 90 |

|  | Tire | | | | | | | |
|---|---|---|---|---|---|---|---|---|
|  | Ex.7 | Ex.8 | Ref.4 | Ref.5 | Ref.6 | Ex.9 | Ex.10 | Ex.11 |
| outboard shoulder main groove | | | | | | | | |
| width Wgo (mm) | 10.2 | 8.7 | 8.2 | 9.3 | 9.3 | 9.3 | 9.3 | 9.3 |
| connection *1 | N | N | N | Y | N | N | N | N |

TABLE 1-continued

| central main groove | | | | | | | | |
|---|---|---|---|---|---|---|---|---|
| width Wgc (mm) | 5 | 7.2 | 8.2 | 6 | 6 | 6 | 6 | 6 |
| connection *1 | Y | Y | Y | Y | N | Y | Y | Y |
| inboard shoulder main groove | | | | | | | | |
| width Wgi (mm) | 9.2 | 8.6 | 8.2 | 9.2 | 9.2 | 9.2 | 9.2 | 9.2 |
| connection *1 | Y | Y | Y | Y | N | Y | Y | Y |
| Wgo/Wgc | 2 | 1.2 | 1 | 1.55 | 1.55 | 1.55 | 1.55 | 1.55 |
| Wgo + Wgc + Wgi (mm) | 24.5 | 24.5 | 24.5 | 24.5 | 24.5 | 24.5 | 24.5 | 24.5 |
| outboard sloping surface | | | | | | | | |
| width Owo (mm) | 3.0 | 3.0 | 3.0 | 3.0 | 3.0 | 3.0 | 3.0 | 3.0 |
| depth Oho (mm) | 0.3 | 0.3 | 0.3 | 0.3 | 0.3 | 0.3 | 0.3 | 0.3 |
| profile | arc | arc | arc | arc | arc | arc | arc | arc |
| (merged ? *2) | Y | Y | Y | Y | Y | Y | Y | Y |
| inboard sloping surface | | | | | | | | |
| width Owi (mm) | 3.0 | 3.0 | 3.0 | 3.0 | 3.0 | 3.0 | 3.0 | 3.0 |
| depth Ohi (mm) | 0.3 | 0.3 | 0.3 | 0.3 | 0.3 | 0.3 | 0.3 | 0.3 |
| profile | arc | arc | arc | arc | arc | arc | arc | arc |
| (merged ? *2) | Y | Y | Y | Y | Y | Y | Y | Y |
| circumferential sipe | | | | | | | | none |
| distance L (mm) | 7 | 7 | 7 | 7 | 7 | 10 | 12 | — |
| noise performance | 110 | 100 | 85 | 100 | 120 | 110 | 105 | 105 |
| wet performance | 105 | 130 | 135 | 110 | 95 | 120 | 120 | 115 |
| steering stability | 110 | 105 | 95 | 100 | 100 | 110 | 105 | 100 |

*1 Was the groove connected to other grooves N = no, Y = yes
*2 Did each sloping surface merge into the tread surface N = no, Y = yes

The invention claimed is:

1. A pneumatic tire comprising:
a tread portion provided with a left-right asymmetric tread pattern comprising three circumferentially continuously extending main grooves which are a central main groove whose widthwise center line is disposed in a tread center region having a width of 20% of a tread width TW of the tread portion and centered on a tire equator, an outboard shoulder main groove, and an inboard shoulder main groove, wherein
a width of the outboard shoulder main groove is larger than a width of the central main groove and a width of the inboard shoulder main groove,
the outboard shoulder main groove connects to neither a groove nor a sipe,
wherein
an inboard sloping surface and an outboard sloping surface are formed on both sides of the outboard shoulder main groove, respectively, so that the inboard sloping surface and the outboard sloping surface extend continuously in a tire circumferential direction and extend in an axial direction of the tire from opposite inboard and outboard groove-sidewalls of the outboard shoulder main groove toward both sides of the outboard shoulder main groove and merge into a tread surface of the tread portion,
a depth of the inboard sloping surface measured radially at the inboard groove-sidewall from the tread surface is in a range of from 0.02 to 0.5 times a width of the inboard sloping surface,
a depth of the outboard sloping surface measured radially at the outboard groove-sidewall from the tread surface is in a range of from 0.02 to 0.5 times a width of the outboard sloping surface, and
in a meridian section of the tire, a radius of curvature of the inboard sloping surface is less than a radius of curvature of the outboard sloping surface.

2. The pneumatic tire according to claim 1, wherein
the width of the outboard sloping surface is more than the width of the inboard sloping surface, and
the depth of the outboard sloping surface is less than the depth of the inboard sloping surface.

3. The pneumatic tire according to claim 1, wherein
the tread pattern further comprises axial sipes connected to the central main groove and the inboard shoulder main groove, and
on both sides of the central main groove and on both sides of the inboard shoulder main groove, sloping surfaces are not formed.

4. The pneumatic tire according to claim 3, wherein edges of the central main groove and the inboard shoulder main groove are chamfered.

5. The pneumatic tire according to claim 1, wherein a circumferentially continuously extending sipe is disposed axially inside the inboard sloping surface at a distance of not more than 10 mm from the outboard shoulder main groove.

6. The pneumatic tire according to claim 2, wherein a circumferentially continuously extending sipe is disposed axially inside the inboard sloping surface at a distance of not more than 10 mm from the outboard shoulder main groove.

7. The pneumatic tire according to claim 3, wherein a circumferentially continuously extending sipe is disposed axially inside the inboard sloping surface at a distance of not more than 10 mm from the outboard shoulder main groove.

8. The pneumatic tire according to claim 4, wherein a circumferentially continuously extending sipe is disposed axially inside the inboard sloping surface at a distance of not more than 10 mm from the outboard shoulder main groove.

9. The pneumatic tire according to claim 1, wherein
the tread pattern further comprises axial grooves connected to the central main groove and the inboard shoulder main groove, and
on both sides of the central main groove and on both sides of the inboard shoulder main groove, sloping surfaces are not formed.

10. The pneumatic tire according to claim 9, wherein the tread pattern further comprises axial grooves extending axially inwardly from tread edges of the tread portion and terminating without being connected to the shoulder main grooves.

\* \* \* \* \*